United States Patent
Drake et al.

(10) Patent No.: US 8,937,879 B2
(45) Date of Patent: Jan. 20, 2015

(54) SYSTEM AND METHOD FOR CHANGING NETWORK TOPOLOGY BASED ON ENERGY CONSUMPTION

(75) Inventors: Jeff Donald Drake, Louisville, KY (US); Charles Ray Smith, Simpsonville, KY (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 13/436,128

(22) Filed: Mar. 30, 2012

(65) Prior Publication Data

US 2013/0258872 A1  Oct. 3, 2013

(51) Int. Cl.
*H04L 1/00* (2006.01)

(52) U.S. Cl.
USPC ............ 370/252; 370/238; 370/251; 370/400

(58) Field of Classification Search
CPC ..... H04L 47/10; H04L 43/50; H04L 43/0852; H04L 43/08; H04L 45/02; H04L 45/04; H04L 45/10; H04W 40/02; H04W 40/24; H04W 40/34; H04W 24/00; H04Q 11/045; H04J 3/14; H04B 17/003
USPC .................................. 370/238, 251, 252, 400
See application file for complete search history.

(56) References Cited

U.S. PATENT DOCUMENTS

| | | | |
|---|---|---|---|
| 7,113,788 B1* | 9/2006 | Chiou et al. | 455/445 |
| 2010/0027437 A1* | 2/2010 | Ratiu | 370/252 |
| 2010/0085903 A1* | 4/2010 | Pandey et al. | 370/311 |
| 2013/0075484 A1* | 3/2013 | Rhee et al. | 236/1 F |
| 2013/0148566 A1* | 6/2013 | Doppler et al. | 370/312 |

* cited by examiner

*Primary Examiner* — Un C Cho
*Assistant Examiner* — Natali N Pascual Peguero
(74) *Attorney, Agent, or Firm* — GE Global Patent Organization; Marc A. Vivenzio

(57) ABSTRACT

A system for managing energy consumption of a mesh network. The system includes a controller, a dynamic routing device configured to perform a functionality of either a routing device or a non-routing device, and at least one processor. The at least one processor is programmed to identify a number of routing devices in the mesh network, determine a signal strength of each of the identified routing devices with respect to at least one of the controller and the dynamic processor, and determine whether the dynamic routing device will perform the functionality of a routing device or a non-routing device upon joining the mesh network based on the number of identified routing devices and the signal strength of each of the identified routing devices.

10 Claims, 2 Drawing Sheets

SYSTEM AND METHOD FOR CHANGING NETWORK TOPOLOGY BASED ON ENERGY CONSUMPTION

BACKGROUND OF THE INVENTION

The field of the invention relates to mesh networks generally, and more specifically to a system and method for reducing energy consumption in a mesh network by dynamically changing a topology of the mesh network.

A mesh network enables each node in the network to not only capture and disseminate its own data, but also serve as a relay for other nodes. As such, mesh networking is a powerful way to route data. Mesh networks permit continuous connections and reconfiguration around broken or blocked paths by "hopping" a packet from device to device until a destination is reached. As such, mesh networks are self-healing in that the network can operate even when a device breaks down or a connection goes bad, which makes mesh networks very reliable.

Further, due to the structure of a mesh network, network stability actually increases as more devices that are capable of routing data to other devices join the network. However, overall energy consumption of the mesh network tends to increase as the number of new devices that join the network as routers increases since routers tend to sleep less than non-router network devices.

BRIEF SUMMARY OF THE INVENTION

Embodiments of the invention address these and other challenges by providing a new mesh network topology that keeps network stability at a maximum but energy consumption at a minimum.

In one aspect, a system for managing energy consumption of a mesh network is provided. The system includes a controller, a dynamic routing device configured to perform a functionality of either a routing device or a non-routing device, and at least one processor. The at least one processor is programmed to identify a number of routing devices in the mesh network, determine a signal strength of each of the identified routing devices with respect to at least one of the controller and the dynamic processor, and determine whether the dynamic routing device will perform the functionality of a routing device or a non-routing device upon joining the mesh network based on the number of identified routing devices and the signal strength of each of the identified routing devices.

In another aspect, a method for managing energy consumption of a mesh network is provided. The method includes sending, from a dynamic routing device configured to perform a functionality of either a routing device or a non-routing device, a broadcast message to all neighboring routing devices and non-routing devices in the mesh network, identifying a number of routing devices in the mesh network, determining a signal strength of each of the identified routing devices, determining whether the dynamic routing device will perform the functionality of a routing device or a non-routing device upon joining the mesh network based on the number of identified routing devices and the signal strength of each of the identified routing devices, and sending, from the dynamic routing device, a request to join the mesh network based on the determination.

In yet another aspect, a dynamic routing device configured to perform a functionality of either a routing device or a non-routing device is provided. The dynamic routing device includes a processor programmed to identify a number of routing devices in a mesh network, determine a signal strength of each of the identified routing devices, and determine whether the dynamic routing device will perform the functionality of a routing device or a non-routing device upon joining the mesh network based on the number of identified routing devices and the signal strength of each of the identified routing devices.

BRIEF DESCRIPTION OF THE DRAWINGS

The present disclosure is described in detail below with reference to the attached figures.

DETAILED DESCRIPTION OF THE INVENTION

Aspects of the present disclosure enable a stability of a mesh network to be maintained while keeping energy consumption of the mesh network at a minimum.

Figure 1:
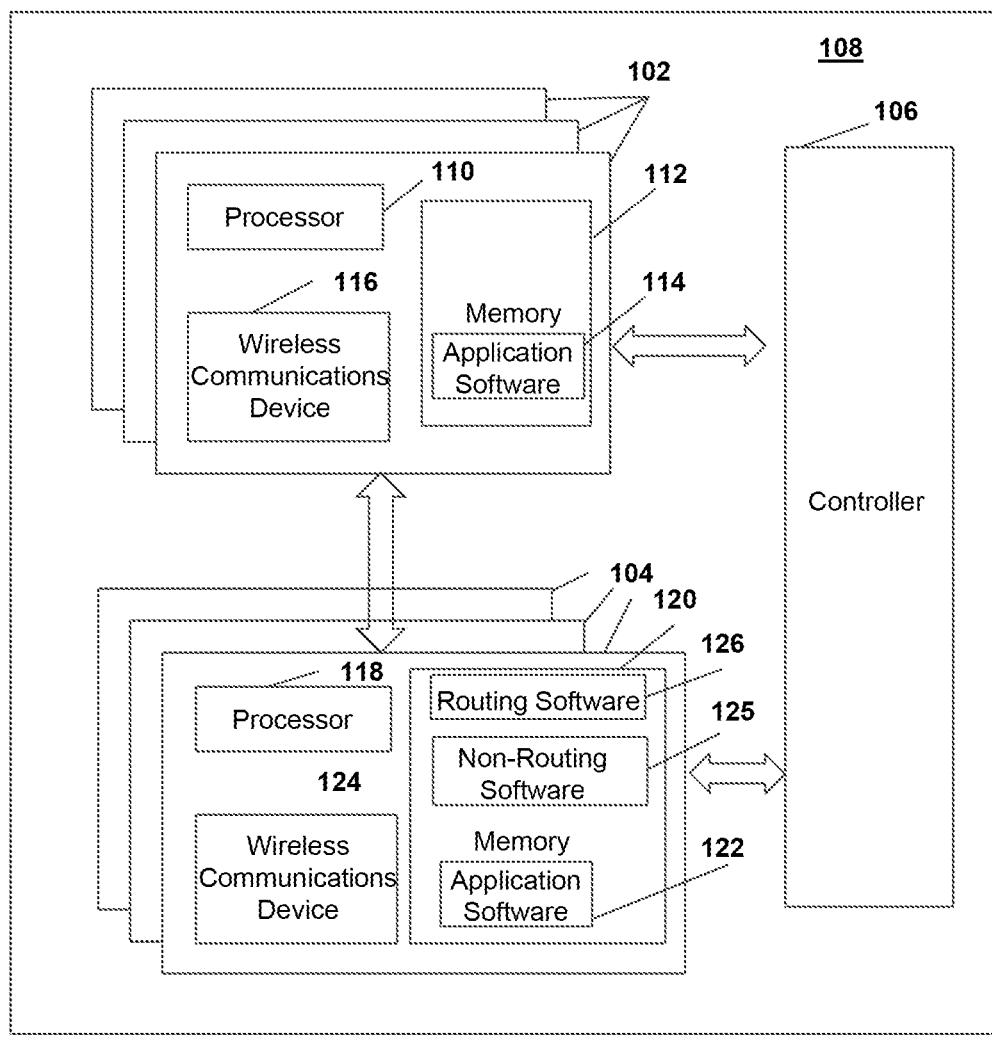
FIG. 1 is a block diagram of a system for managing energy consumption of a mesh network by dynamically changing a topology of the mesh network.

Referring now to FIG. 1, a system 100 for changing a network topology based on energy consumption of the network is provided. The network is preferably a mesh network. System 100 includes a plurality of non-routing devices 102, a plurality of routing devices 104, and a controller 106, which make up network 108. In one embodiment, one or more of the non-routing devices 102, routing devices 104, and controller 106 may be components of, and/or coupled with, an appliance, a building system and/or a computer. Non-limiting examples of appliances include a refrigerator, a washer, a dryer, an oven, a stove, a microwave oven, a dishwasher. Non-limiting examples of a building system include a heating, ventilation, and air conditioning system, and the like. Non-limiting examples of a computer include smartphones, tablet computers, and desktop computers.

In one embodiment, non-routing devices 102 each include a processor 110 that is coupled with a memory 112 and a wireless communication device 116. The memory 112 is computer-readable and stores computer-readable instructions that when executed by the processor 110 cause the processor 110 to perform one or more functions. Such computer-readable instructions may be referred to herein as application software 114.

Further, routing devices 104 each include a processor 118 that is coupled with a memory 120 and a wireless communication device 124. The memory 120 is computer-readable that stores computer-readable instructions that when executed by the processor 118 cause the processor 118 to perform one or more functions. Such computer-readable instructions may be referred to herein as application software 122.

The wireless communication devices 116 and 124, and controller 106 are configured to communicate using a wireless communications protocol. A non-limiting example of such is the IEEE 802.15.4 protocol. In one embodiment, controller 106 is a ZIGBEE® (hereinafter referred to as "Zigbee") coordinator. The controller 106 may be configured to search for a suitable wireless channel (e.g., a wireless channel that has least activity) that uses the IEEE 802.15.4 protocol, to initiate an IEEE 802.15.4 network by assigning a personal network identification (PAN ID), and allow routers and non-routing devices to join the PAN. However, other suitable wireless protocols may be used.

Each processor 110 in non-routing devices 102 is in communication with memory 112, which is a computer-readable medium. Memory 112 stores software and other configuration information used by processor 110 to perform various tasks to be executed by non-routing device 102. For example, in one embodiment, processor 110 is configured to execute the application software 114 stored in the memory 112 to determine the quality of a communication link established between non-routing device 102, routing devices 104 and/or controller 106. In one embodiment, each wireless communication device 116 is in communication with processors 110 and 118.

Each processor 118 in routing devices 104 is in communication with memory 120, which includes a computer-readable medium. Memory 120 stores software and other configuration information used by processor 118 to perform various tasks to be executed by routing device 104. For example, in one embodiment, processor 118 is configured to execute software 122 stored in memory 120 to determine a link quality of routing device 102 with respect to at least one of routing devices 104, controller 106, and other routing devices 102. In one embodiment, each wireless communication device 124 is in communication with processors 118 and includes wireless devices capable of communicating using the IEEE 802.15.4 protocol.

In one embodiment, the one or more routing devices 104 include non-routing software 125 stored in the memory 120, that, when executed by processor 118, enables routing device 104 to be dynamically changed into and operate as a non-routing device. Thus, a routing device 104 that is dynamically changed into a non-routing device by the processor 118 executing the non-routing software 125 can sleep and/or turn itself off for periods of time. This is an advantage over traditional routing devices, which because they contain only routing software, cannot sleep. As such, one or more routing devices 104 may be configured, based on one or more factors, to dynamically change from executing routing software 126 to executing non-routing software 125 before and/or upon joining a mesh network. A non-limiting example of a factor that can be processed to determine whether a dynamic change is required for a device 102, 104 that joins a mesh network 108 is the overall energy consumption of the mesh network 108. For these reasons, the routing device 104 may be referred to herein as a "dynamic routing device 104".

In one embodiment, the computer-executable non-routing software 125 stored in memory 120 can be stored and executed from a memory area that is physically remote from non-routing devices 102 and/or the routing devices 104. For example, computer-executable instructions may be stored in a server associated with a network cloud service, in a database, or in another memory area that is determinable by non-routing devices 102 and/or routing devices 104. Such embodiments reduce the computational and storage burden on the non-routing devices 102 and routing devices 104. However, it is also contemplated that such computer-executable non-routing software 125 stored in memory 120 can also be stored and executed from a memory area that is physically proximate non-routing devices 102 and/or the routing devices 104.

As mentioned above, network stability increases as the number of routing devices 104 increases. However, the more devices in a mesh network that are configured to route data, the more energy the mesh network consumes. Thus, to enable system 100 to conserve energy as well as maintain network stability, aspects of the present disclosure enable a routing device (e.g., routing device 104) to join network 108, but operate (at least temporarily) as a non-routing device.

For example, a routing device (e.g., routing device 104 of FIG. 1) that attempts to join a network (e.g., network 108 of FIG. 1), is configured to send a broadcast message to all immediate neighbors within wireless communication range and waits for their replies. As routing device 104 receives one or more replies, it identifies whether or not the neighboring devices are routing devices or non-routing devices. In one embodiment, routing device 104 maintains a list of the number of neighboring routing devices that respond, as well as a received signal strength indication (RSSI) from each device identified as a router. Routing device 104 can use the list of identified neighboring routers, along with an RSSI from each identified neighboring router to determine whether or not routing device 104 should join the network 108 as a routing device or as a non-routing device.

Figure 2:
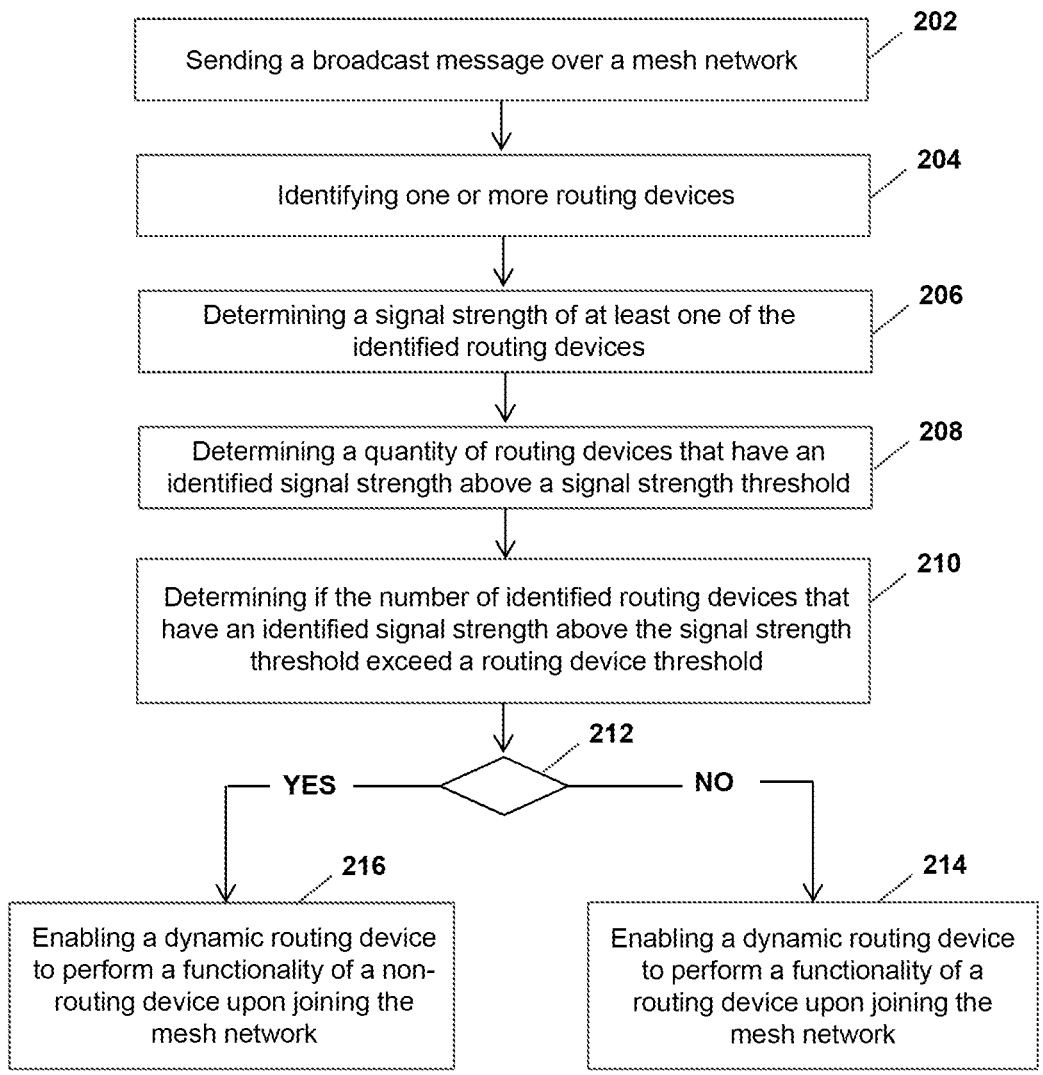
FIG. 2 is a process flow diagram of a method for managing energy consumption of a mesh network.

With reference now to FIG. 2, an exemplary flow chart illustrates enabling a dynamic routing device (e.g., routing device 104 of FIG. 1) to join a network (e.g., network 108) as either a routing device or a non-routing device. At 202, the dynamic routing device sends a broadcast message to all neighboring devices within a particular radio range. The particular radio range may vary based on, for example, radio strength of the dynamic routing device. In one embodiment, the broadcast message is a one-hop broadcast message (e.g., the broadcast message only extends to a node and all of its neighbors). At 204, a number of routing devices in the mesh network are identified. In one embodiment, the dynamic routing device receives information from each of the neighboring devices based on the one-hop broadcast. In one embodiment, the information includes signal strength in an RSSI indication of each identified neighboring device as well as data regarding whether or not each identified neighboring device is a routing device or a non-routing device. At 206, a signal strength of each of the identified routing devices is determined. At 208, the quantity of identified routing devices that have a signal strength above a signal strength threshold level is determined. At 210, it is determined whether the number of identified routing devices that have a signal strength above a signal strength threshold exceed a routing device threshold. At 212, if the number of identified routing devices that have a signal strength above a signal strength threshold do not exceed a routing device threshold, then at 214, the dynamic routing device is enabled to perform the functionality of a routing device upon joining the mesh network. However, if at 212, the number of identified routing devices that have a signal strength above a signal strength threshold does exceed a routing device threshold, then at 216, the dynamic routing device is enabled to perform the functionality of a non-routing device before or upon joining the mesh network. In one embodiment, if two or more neighboring devices are determined to be routing devices and each of these routing devices have a signal strength above a predefined threshold, the dynamic routing device 104 is dynamically configured to join the network 108 as a non-routing device to reduce the network's energy consumption. In contrast, if fewer than two neighboring devices are determined to be routing devices, the dynamic routing device 104 joins the network 108 as a routing device.

The embodiments herein shown, described and/or claimed are not limited to determining whether a device 104 joins the network 108 as a routing device or as a non-routing devices based on a particular quantity of routing devices currently on the network or determining the particular signal strength threshold of the routing devices currently on the network. For example, a user may determine whether a device joins a network as a routing device or a non-routing device.

Aspects of the present disclosure enable reduction in a network's energy consumption and/or that of individual network devices while maintaining and/or increasing network stability. Thus, many factors can be taken into consideration when determining whether or not to enable a dynamic routing device to join a network as a routing device (and increase power consumption of the network), or enable the dynamic routing device to join the network as a non-routing device (and decrease the power consumption of the network). Such factors include, but are not limited to: a size of the network; a quantity of data traffic across the network; reliability of current routing devices on the network; as well as user preferences. For example, a user may determine whether or not to enable a dynamic routing device 104 to be configured as a routing device or a non-routing device upon joining a network 108.

While embodiments of the disclosure are illustrated and described herein with reference to dynamically changing a topology of a mesh network, and more specifically to a system and method for reducing energy consumption of a mesh network by dynamically changing a topology of the mesh network, aspects of the disclosure are operable with any system that performs the functionality illustrated and described herein, or its equivalent.

Exemplary Operating Environment

A controller or computing device such as described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, tablet computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for managing energy consumption of a mesh network, the system comprising: a controller; a dynamic routing device configured to perform a functionality of either a routing device or a non-routing device; and at least one processor programmed to: identify a number of routing devices in the mesh network; determine a signal strength of each of the identified routing devices; and determine whether the dynamic routing device will perform the functionality of a routing device or a non-routing device upon joining the mesh network based on the number of identified routing devices and the signal strength of each of the identified routing devices, wherein in determining whether the dynamic routing device will perform the functionality of a routing device or a non-routing device, the at least one processor is further programmed to: determine the quantity of identified routing devices that have a signal strength above a signal strength threshold; and if the number of identified routing devices that have a signal strength above a signal strength threshold exceeds a routing device threshold, enable the dynamic routing device to perform the functionality of a routing device upon joining the mesh network.

2. The system of claim 1, wherein the at least one processor is further programmed to send a broadcast message to all neighboring routing devices and non-routing devices.

3. The system of claim 2, wherein the broadcast message is a one-hop broadcast message.

4. The system of claim 1, wherein the signal strength is determined from a received signal strength indication (RSSI).

5. A method for managing energy consumption of a mesh network, the method comprising:
sending, from a dynamic routing device configured to perform a functionality of either a routing device or a non-routing device, a broadcast message to all neighboring routing devices and non-routing devices in the mesh network; identifying a number of routing devices in the mesh network; determining a signal strength of each of the identified routing devices; and determining whether the dynamic routing device will perform the functionality of a routing device or a non-routing device upon joining the mesh network based on the number of identified routing devices and the signal strength of each of the identified routing devices, wherein determining whether the dynamic routing device will perform the functionality of a routing device or a non-routing device comprises: determining the quantity of identified routing devices that have a signal strength above a signal strength threshold; and if the number of identified routing devices that have a signal strength above a signal strength threshold exceeds a routing device threshold, enable the dynamic routing device to perform the functionality of a routing device upon joining the mesh network.

6. A dynamic routing device configured to perform a functionality of either a routing device or a non-routing device, the dynamic routing device comprising at least one processor programmed to: identify a number of routing devices in a mesh network; determine a signal strength of each of the identified routing devices; and determine whether the dynamic routing device will perform the functionality of a routing device or a non-routing device upon joining the mesh network based on the number of identified routing devices and the signal strength of each of the identified routing devices, wherein in determining whether the dynamic routing device will perform the functionality of a routing device or a non-routing device, the at least one processor is further programmed to: determine the quantity of identified routing devices that have a signal strength above a signal strength threshold; and if the number of identified routing devices that have a signal strength above a signal strength threshold exceeds a routing device threshold, enable the dynamic routing device to perform the functionality of a routing device upon joining the mesh network.

7. The dynamic routing device of claim 6, wherein the at least one processor is further programmed to send a broadcast message to all neighboring routing devices and non-routing devices.

8. The dynamic routing device of claim 7, wherein the broadcast message is a one-hop broadcast message.

9. The dynamic routing device of claim 7, wherein the signal strength is determined from a received signal strength indication (RSSI).

10. The dynamic routing device of claim 7, wherein the at least one processor is further programmed to send from the dynamic routing device, a request to join the mesh network based on the determination.

\* \* \* \* \*